US012573704B2

(12) United States Patent
Rhim et al.

(10) Patent No.: US 12,573,704 B2
(45) Date of Patent: Mar. 10, 2026

(54) BATTERY PACK HOUSING HAVING FIRE INHIBITION STRUCTURE

(71) Applicant: LG ENERGY SOLUTION, LTD., Seoul (KR)

(72) Inventors: So Eun Rhim, Daejeon (KR); Hyong Seok Yoo, Daejeon (KR); Hae Jin Kim, Daejeon (KR); Hyoung Suk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 668 days.

(21) Appl. No.: 17/915,828

(22) PCT Filed: Oct. 13, 2021

(86) PCT No.: PCT/KR2021/014085
§ 371 (c)(1),
(2) Date: Sep. 29, 2022

(87) PCT Pub. No.: WO2022/086030
PCT Pub. Date: Apr. 28, 2022

(65) Prior Publication Data
US 2023/0155236 A1      May 18, 2023

(30) Foreign Application Priority Data

Oct. 19, 2020      (KR) ........................ 10-2020-0135104

(51) Int. Cl.
*H01M 50/262*      (2021.01)
*H01M 50/227*      (2021.01)
*H01M 50/278*      (2021.01)

(52) U.S. Cl.
CPC ....... *H01M 50/262* (2021.01); *H01M 50/227* (2021.01); *H01M 50/278* (2021.01)

(58) Field of Classification Search
None
See application file for complete search history.

(56) References Cited

U.S. PATENT DOCUMENTS

2010/0273040 A1      10/2010   Kubota et al.
2012/0100413 A1      4/2012   Okano et al.
(Continued)

FOREIGN PATENT DOCUMENTS

CN          104037368 A          9/2014
CN          103119746 B          1/2016
(Continued)

OTHER PUBLICATIONS

Machine Translation of JP-2014022154-A (Year: 2014).*
(Continued)

*Primary Examiner* — Gregg Cantelmo
(74) *Attorney, Agent, or Firm* — Birch, Stewart, Kolasch & Birch, LLP

(57)          ABSTRACT

A battery pack housing includes a lower case configured to receive a plurality of battery cells and an upper cover located on the lower case so as to be coupled to the lower case in order to inhibit fire spread when fire breaks out in a battery pack, wherein the lower case includes a lower case fastening portion formed at the edge of the lower case so as to protrude and extend outwards, the upper cover includes an upper cover fastening portion formed at the edge of the upper cover so as to protrude and extend outwards, the upper cover fastening portion being coupled to the lower case fastening portion, and the upper cover fastening portion includes a first bent portion formed as the result of the end of the upper cover fastening portion being bent downwards.

9 Claims, 3 Drawing Sheets

(56)                References Cited

U.S. PATENT DOCUMENTS

| | | |
|---|---|---|
| 2013/0034773 A1 | 2/2013 | Tsukuda et al. |
| 2013/0252058 A1 | 9/2013 | Kim |
| 2013/0252059 A1 | 9/2013 | Choi et al. |
| 2013/0295435 A1 | 11/2013 | Vu |
| 2014/0352886 A1 | 12/2014 | Choi et al. |
| 2015/0243956 A1* | 8/2015 | Loo ..................... H01M 50/271 429/96 |
| 2017/0018747 A1* | 1/2017 | Yamada .............. H01M 10/625 |
| 2017/0113848 A1 | 4/2017 | Zhen |

FOREIGN PATENT DOCUMENTS

| | | |
|---|---|---|
| CN | 105514311 A | 4/2016 |
| CN | 206022437 U | 3/2017 |
| CN | 206163565 U | 5/2017 |
| CN | 206364071 U | 7/2017 |
| CN | 207398211 U | 5/2018 |
| CN | 207409557 U | 5/2018 |
| CN | 207438909 U | 6/2018 |
| CN | 110277520 A | 9/2019 |
| JP | 2006-164716 A | 6/2006 |
| JP | 5091060 B2 | 12/2012 |
| JP | 2013-109845 A | 6/2013 |
| JP | 2014022154 A * | 2/2014 |
| KR | 10-1174664 B1 | 8/2012 |
| KR | 10-2013-0107823 A | 10/2013 |
| KR | 10-2014-0110444 A | 9/2014 |
| KR | 10-2016-0116566 A | 10/2016 |
| KR | 10-1698770 B1 | 1/2017 |
| KR | 10-2018-0005971 A | 1/2018 |
| KR | 10-2020-0135104 A | 12/2020 |

OTHER PUBLICATIONS

International Search Report (PCT/ISA/210) issued in PCT/KR2021/014085 mailed on Jan. 17, 2022.

European Search Report for European Application No. 21883101.4, dated Jun. 25, 2024.

* cited by examiner

【FIG. 1】
1
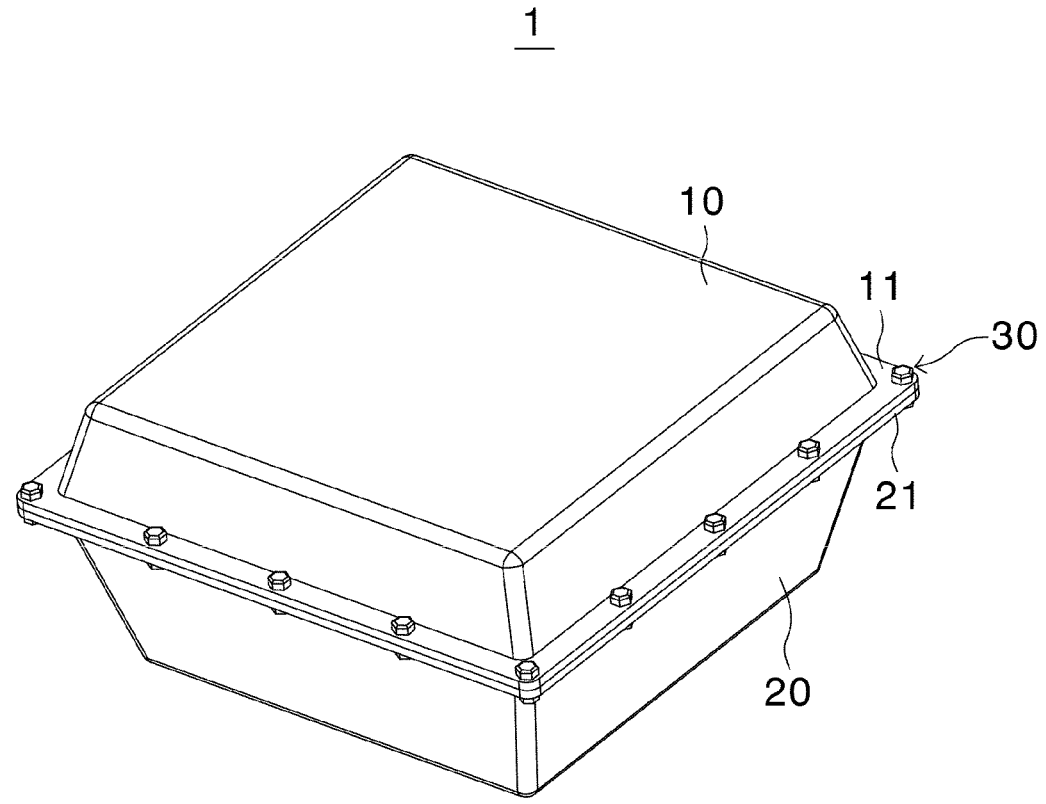
Conventional Art

【FIG. 2】
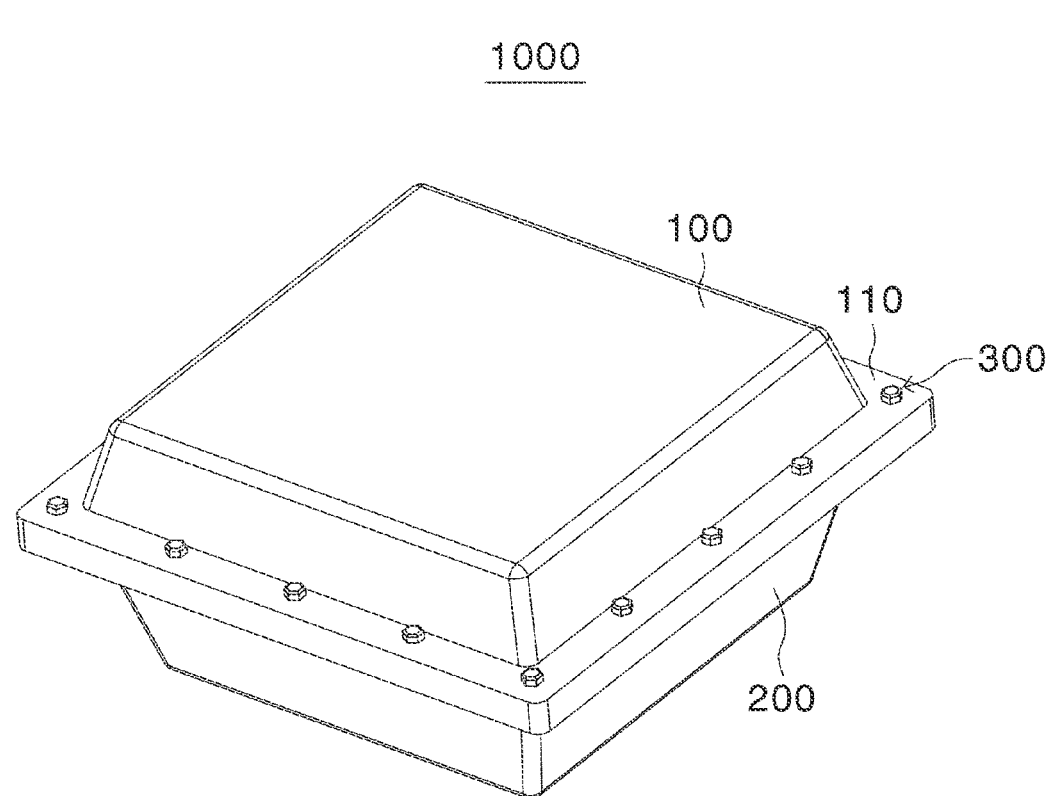

【FIG. 3】
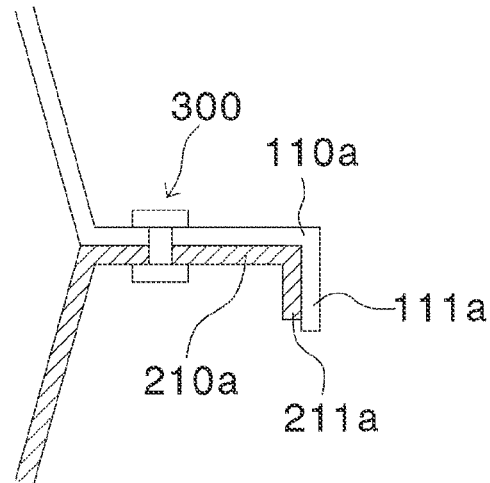
【FIG. 4】
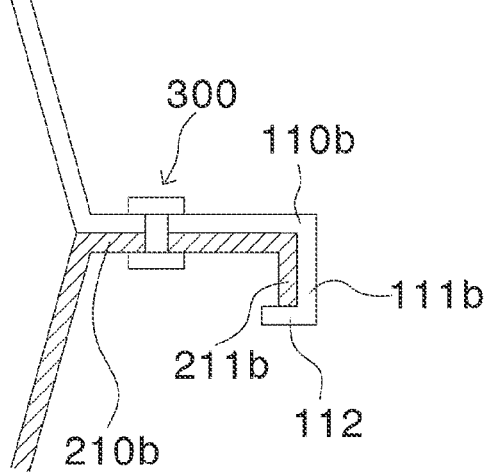

BATTERY PACK HOUSING HAVING FIRE INHIBITION STRUCTURE

TECHNICAL FIELD

This application claims the benefit of priority to Korean Patent Application No. 2020-0135104 filed on Oct. 19, 2020, the disclosure of which is incorporated herein by reference in its entirety.

The present invention relates to a battery pack housing including a bent portion formed at the end of an upper cover fastening portion and an extension portion formed at the end of a lower case fastening portion in order to prevent introduction of oxygen, thereby inhibiting spread of fire.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. In the case in which output voltage higher than the above operating voltage is required, therefore, a plurality of battery cells may be connected to each other in series to constitute a battery cell assembly. In addition, battery cell assemblies may be connected to each other in series or in parallel to constitute a battery module depending on required output voltage or charge and discharge capacities. In general, a battery pack is manufactured using at least one battery module by adding an additional component.

Since a lithium secondary battery has a risk of explosion or fire due to heat generation, however, securing safety is an important problem. If such an abnormal phenomenon is not dealt with in the initial stage, the abnormal phenomenon propagates to an adjacent secondary battery, whereby a battery pack may be greatly damaged.

Meanwhile, a battery pack is generally manufactured so as to have a structure in which a plurality of battery cells and various components are received in a battery pack housing.

FIG. 1 is a perspective view briefly showing a conventional battery pack housing 1. The conventional battery pack housing 1 includes a lower case 20 configured to receive a plurality of battery cells, an upper cover 10 coupled to the lower case 20 in order to form the battery pack housing 1 together with the lower case, and a fastening means 30 configured to couple the lower case 20 and the upper case 10 to each other.

In addition, an upper cover fastening portion 11 is formed at the edge of the upper cover 10 in a state of protruding and extending outwards, a lower case fastening portion 21 is formed at the lower case 20 so as to have a shape corresponding to the upper cover fastening portion, and the upper cover 10 and the lower case 20 are coupled to each other via a fastening means 30, such as a bolt and nut.

Even though fastening is performed as described above, however, airtight hermetic sealing is not completely achieved at the joint at which the upper cover 10 and the lower case 20 are coupled to each other.

When fire breaks out in the conventional battery pack housing 1, therefore, external oxygen is abruptly introduced through a microscopic gap in the joint of the lower case 20 and the upper cover 10 due to an instantaneous difference in pressure between the inside and outside of the conventional battery pack housing, whereby fire may spread and explosion may occur in a severe case.

In order to solve such a sealing problem, a method of sealing the entirety of the joint using a sealing member may be used. In this case, however, an additional process is necessary and thus cost is increased. Furthermore, it is difficult to separate the lower case 20 and the upper cover 10 from each other after sealing.

DISCLOSURE

Technical Problem

The present invention has been made in view of the above problems, and it is an object of the present invention to provide a battery pack housing including a bent portion formed at the end of an upper cover fastening portion and an extension portion formed at the end of a lower case fastening portion in order to prevent introduction of oxygen, thereby inhibiting spread of fire.

Technical Solution

In order to accomplish the above object, a battery pack housing according to the present invention includes a lower case configured to receive a plurality of battery cells and an upper cover located on the lower case so as to be coupled to the lower case in order to inhibit fire spread when fire breaks out in a battery pack, wherein the lower case includes a lower case fastening portion formed at the edge of the lower case so as to protrude and extend outwards, the upper cover includes an upper cover fastening portion formed at the edge of the upper cover so as to protrude and extend outwards, the upper cover fastening portion being coupled to the lower case fastening portion, and a first bent portion may extend downwardly from an end of the upper cover fastening portion.

Also, the battery pack housing according to the present invention may further include a fastener configured to couple the lower case and the upper cover to each other.

Also, in the battery pack housing according to the present invention, the fastener may be a bolt and nut.

Also, in the battery pack housing according to the present invention, the fastener may be inserted through a through-hole formed in the upper cover fastening portion and a through-hole formed in the lower case fastening portion to fasten the upper cover fastening portion and the lower case fastening portion to each other.

Also, in the battery pack housing according to the present invention, an extension portion may extend downwardly from an end of the lower case fastening portion, the extension portion being located at a position corresponding to the first bent portion.

Also, in the battery pack housing according to the present invention, the upper cover fastening portion may further include a second bent portion formed at the end of the first bent portion so as to be bent toward the center of the battery pack housing.

Also, in the battery pack housing according to the present invention, each of the first bent portion and the extension portion may be made of thermoplastic.

Also, in the battery pack housing according to the present invention, the second bent portion may be made of thermoplastic.

In addition, a battery pack according to the present invention includes one of the battery pack housings according to the present invention.

In addition, a device according to the present invention includes the battery pack according to the present invention.

Advantageous Effects

A battery pack housing according to the present invention has an advantage in that a bent portion is provided at the end of an upper cover fastening portion and an extension portion is provided at the end of a lower case fastening portion, whereby it is possible to prevent introduction of oxygen from the outside and to inhibit discharge of flames to the outside when fire breaks out in a battery pack.

In addition, the battery pack housing according to the present invention has an advantage in that hermeticity between the inside and outside of the battery pack housing is improved even though a separate sealing process is not added.

In addition, the battery pack housing according to the present invention has an advantage in that the degree of coupling between the upper cover and the lower case is increased due to the bent portion provided at the upper cover fastening portion and the extension portion provided at the lower case fastening portion, whereby mechanical stiffness against vibration and impact is increased.

DESCRIPTION OF DRAWINGS

FIG. 1 is a perspective view briefly showing a conventional battery pack housing.

FIG. 2 is a perspective view briefly showing a battery pack housing according to an embodiment of the present invention.

FIG. 3 is a sectional view showing coupling between an upper cover fastening portion and a lower case fastening portion according to an embodiment of the present invention.

FIG. 4 is a sectional view showing coupling between an upper cover fastening portion and a lower case fastening portion according to another embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack housing according to the present invention will be described with reference to the accompanying drawings.

FIG. 2 is a perspective view briefly showing a battery pack housing according to an embodiment of the present invention.

When describing the battery pack housing 1000 according to the present invention with reference to FIG. 2, the battery pack housing 1000 includes a lower case 200 configured to receive a plurality of battery cells and various components constituting a battery pack and an upper cover 100 coupled to the lower case 200 in order to form the battery pack housing 1000 together with the lower case.

In general, a battery cell used to manufacture a battery pack may be classified as a cylindrical battery cell, a prismatic battery cell, or a pouch-shaped battery cell depending on the shape of a case. The battery pack housing 1000 according to the present invention may be used to manufacture various battery packs without being limited to the shape of the battery cell.

In addition, the battery pack housing 1000 further includes a fastening means 300 configured to couple the lower case 200 and the upper cover 100 to each other.

In the present invention, bolts and nuts capable of mechanically coupling the lower case 200 and the upper cover 100 to each other may be used as the fastening means 300. However, the present invention is not limited thereto, and various known fastening means may be used.

Meanwhile, although parts unnecessary to describe features of the battery pack housing 1000 according to the present invention are briefly shown, as shown in FIG. 2, the battery pack housing 1000 according to the present invention may generally have various structures such that various components, such as an apparatus for connection with an external device or a cooling apparatus, are provided inside or outside a battery pack.

FIG. 3 is a sectional view showing coupling between an upper cover fastening portion and a lower case fastening portion according to an embodiment of the present invention.

When describing the structure of the battery pack housing 1000 according to the present invention in more detail with reference to FIGS. 2 and 3, an upper cover fastening portion 110a is formed at the edge of the upper cover 100 in a state of protruding and extending outwards, and a lower case fastening portion 210a is formed at the edge of the lower case 200 in a state of protruding and extending outwards so as to correspond to the upper cover fastening portion.

Consequently, the lower case fastening portion 210a is located at the upper cover fastening portion 110a, and then the lower case 200 and the upper cover 100 are coupled to each other using the fastening means 300.

When bolts and nuts are used as the fastening means 300, the bolts are inserted through a plurality of through-holes formed in each of the upper cover fastening portion 110a and the lower case fastening portion 210a, and then the nuts are fastened to the bolts, whereby the lower case 200 and the upper cover 100 are coupled to each other.

Even though fastening is performed using the fastening means 300, however, hermetic sealing is not completely achieved. As shown in FIG. 3, therefore, the battery pack housing 1000 according to the present invention is provided with a first bent portion 111a formed as the result of the end of the upper cover fastening portion 110a being bent downwards and an extension portion 211*a* formed as the result of the end of the lower case fastening portion 210*a* being bent downwards so as to correspond to the first bent portion 111*a*.

When fire breaks out in the battery pack housing 1000, introduction of oxygen into the battery pack housing is difficult due to the provision of the first bent portion 111*a* and the extension portion 211*a*, compared to a conventional battery pack housing.

As a result, it is possible to inhibit fire spread due to introduction of oxygen from the outside, and flames in the battery pack housing are prevented from being directly discharged to the outside.

In addition, when the first bent portion 111*a* and the extension portion 211*a* are formed, an additional sealing process of hermetically sealing the battery pack housing 1000 is not necessary, and the upper cover 100 and the lower case 200 may be easily separated from each other by simply removing the fastening means.

FIG. 4 is a sectional view showing coupling between an upper cover fastening portion and a lower case fastening portion according to another embodiment of the present invention.

As shown in FIG. 4, the battery pack housing 1000 according to the present invention may further include a second bent portion formed at the end of a first bent portion 111*b* so as to be bent therefrom in a direction toward the center of the battery pack housing 1000.

In the case in which the second bent portion 112 is provided at the upper cover fastening portion 110*b* in addition to the first bent portion 111*b*, as described above, it is more difficult to form an oxygen introduction path, whereby it is possible to more effectively prevent introduction of oxygen from the outside.

Meanwhile, as shown in FIGS. 3 and 4, the upper cover fastening portion 110*a* or 110*b* and the lower case fastening portion 210*a* or 210*b* coupled to each other via the fastening means 300 are fastened to each other in contact with each other.

In addition, the first bent portion 111*a* or 111*b* and the extension portion 211*a* or 211*b* and the second bent portion 112 and the extension portion 211*b* may be configured to contact each other at the time of fastening.

Additionally, in the battery pack housing 1000 according to the present invention, each of the first bent portion 111*a* or 111*b*, the second bent portion 112, and the extension portion 211*a* or 211*b* may be made of a material that is plastically deformed by heat generated when fire breaks out or a material that melts at a portion or the entirety of the contact surface thereof, such as thermoplastic.

In this case, the gap between the first bent portion 111*a* or 111*b* and the extension portion 211*a* or 211*b* and the gap between the second bent portion 112 and the extension portion 211*b* is hermetically sealed by the molten material, whereby it is possible to prevent introduction of oxygen from the outside.

In addition, the entireties of the upper cover fastening portion 110*a* or 110*b* and the lower case fastening portion 210*a* or 210*b* may be made of such a material, instead of only the first bent portion 111*a* or 111*b*, the second bent portion 112, and the extension portion 211*a* or 211*b*, which are ends of the upper cover fastening portion 110*a* or 110*b* and the lower case fastening portion 210*a* or 210*b*, being made of the material.

Alternatively, the entirety of the upper cover 100 may be made of a material that is plastically deformed by heat generated when fire breaks out, such as thermoplastic, whereby it is possible to prevent introduction of oxygen from the outside as the result of deformation of the upper cover.

In the case in which the entirety of the upper cover 100 is made of the same material, as described above, it is possible to more easily manufacture the upper cover 100 using various known plastic processing methods.

Meanwhile, in the case in which a structure, such as the first bent portion 111*a* or 111*b*, the second bent portion 112, or the extension portion 211*a* or 211*b*, is added to the battery pack housing 1000, as described above, the degree of coupling between the upper cover 100 and the lower case 200 is increased, whereby mechanical stiffness against vibration and impact is increased.

In addition, a plurality of battery cells may be received in the battery pack housing 1000 having the fire inhibition function according to the present invention, and various components configured to control operation of the battery cells may be added to manufacture a battery pack.

The battery pack manufactured as described above is generally used as a power source for various devices, such as electronic devices and electric vehicles.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

The invention claimed is:

1. A battery pack housing comprising:
a lower case configured to receive a plurality of battery cells; and
an upper cover located on the lower case so as to be coupled to the lower case,
wherein the lower case comprises a lower case fastening portion formed at an edge of the lower case so as to protrude and extend outwards,
wherein the upper cover comprises an upper cover fastening portion formed at an edge of the upper cover so as to protrude and extend outwards, the upper cover fastening portion being coupled to the lower case fastening portion,
wherein a first bent portion extends downwardly from an end of the upper cover fastening portion,
wherein an extension portion extends downwardly from an end of the lower case fastening portion, the extension portion being located at a position corresponding to the first bent portion,
wherein the upper cover fastening portion further comprises a second bent portion formed at an end of the first bent portion so as to be bent toward a center of the battery pack housing,
wherein an inner surface of the first bent portion directly contacts an outer surface of the extension of the lower case and an upper surface of the second bent portion directly contacts a lower surface of the extension portion of the lower case, and
wherein the first bent portion extends around an entire perimeter of the upper cover.

2. The battery pack housing according to claim 1, further comprising a fastener configured to couple the lower case and the upper cover to each other.

3. The battery pack housing according to claim 2, wherein the fastener is a bolt and nut.

4. The battery pack housing according to claim 2, wherein the fastener is inserted through a through-hole formed in the upper cover fastening portion and a through-hole formed in the lower case fastening portion to fasten the upper cover fastening portion and the lower case fastening portion to each other.

5. The battery pack housing according to claim 1, wherein each of the first bent portion and the extension portion is made of thermoplastic.

6. The battery pack housing according to claim 1, wherein the second bent portion is made of thermoplastic.

7. A battery pack comprising the battery pack housing according to claim 1.

8. A device comprising the battery pack according to claim 7.

9. A battery pack housing comprising:

a lower case configured to receive a plurality of battery cells; and an upper cover located on the lower case so as to be coupled to the lower case, wherein the lower case comprises a lower case fastening portion formed at an edge of the lower case so as to protrude and extend outwards, wherein the upper cover comprises an upper cover fastening portion formed at an edge of the upper cover so as to protrude and extend outwards, the upper cover fastening portion being coupled to the lower case fastening portion, wherein a first bent portion extends downwardly from an end of the upper cover fastening portion, wherein an extension portion extends downwardly from an end of the lower case fastening portion, the extension portion being located at a position corresponding to the first bent portion, wherein the upper cover fastening portion further comprises a second bent portion formed at an end of the first bent portion so as to be bent toward a center of the battery pack housing, wherein an inner surface of the first bent portion directly contacts an outer surface of the extension of the lower case and an upper surface of the second bent portion directly contacts a lower surface of the extension portion of the lower case, and wherein the second bent portion extends around an entire perimeter of the first bent portion.

* * * * *